G. STRASZER.
Rainwater Cut-Offs.
No. 150,101. Patented April 21, 1874.
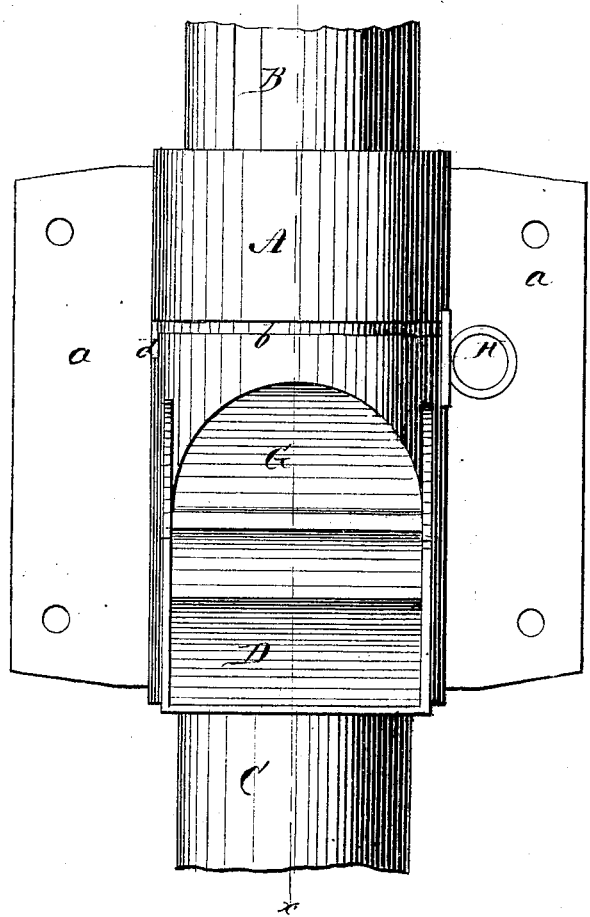
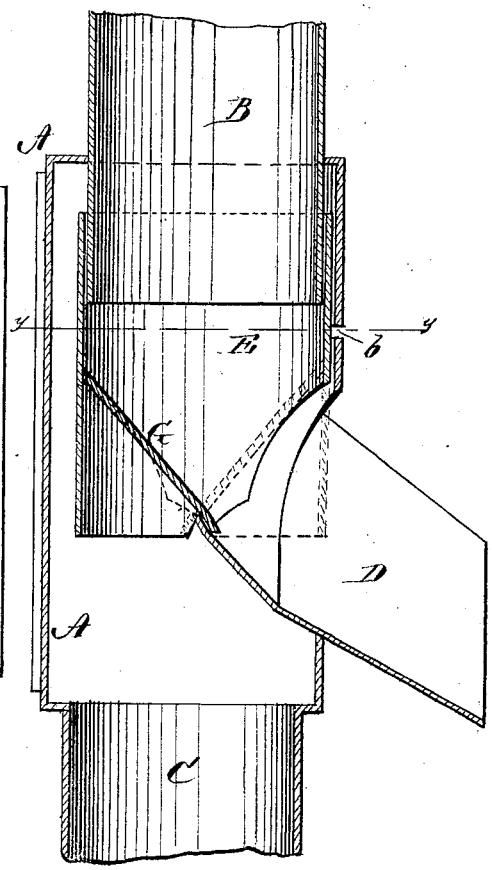
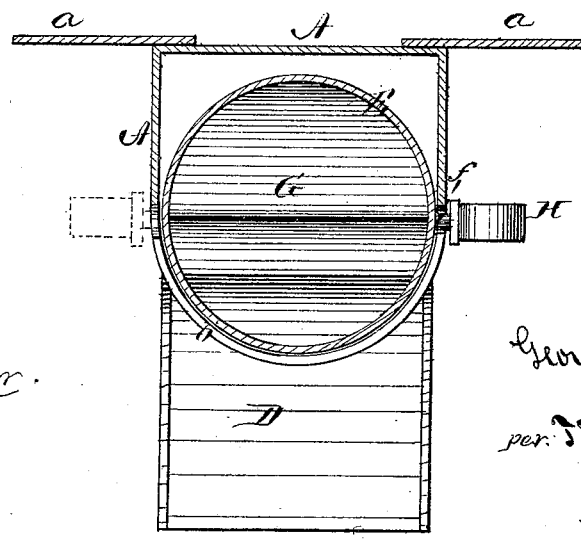

UNITED STATES PATENT OFFICE.

GEORGE STRASZER, OF MANCHESTER, MISSOURI.

IMPROVEMENT IN RAIN-WATER CUT-OFFS.

Specification forming part of Letters Patent No. 150,101, dated April 21, 1874; application filed October 16, 1873.

*To all whom it may concern:*

Be it known that I, GEORGE STRASZER, of Manchester, in the county of St. Louis and State of Missouri, have invented certain new and useful Improvements in Rain-Water Cut-Off; and I do hereby declare that the following is a full, clear, and exact description thereof, reference being had to the accompanying drawings, and to the letters of reference marked thereon, which form a part of this specification.

The nature of my invention consists in the construction and arrangement of a cut-off for conducting rain-water from the eaves of a building in or out of a cistern, as will be hereinafter more fully set forth.

In order to enable others skilled in the art to which my invention appertains to make and use the same, I will now proceed to describe its construction and operation, referring to the annexed drawing, in which—

Figure 1 is a front elevation; Fig. 2, a vertical section through the line $x$ $x$, Fig. 1; and Fig. 3, a horizontal section through the line $y$ $y$, Fig. 2, of my rain-water cut-off.

A represents a rectangular box of any suitable dimensions, provided with side flanges $a$ $a$, to be attached to the side of a house. In the upper end of this box is a pipe, B, extending above the box, and also for a suitable distance downward into the same. This pipe is intended to receive the rain-water pipe. In the bottom or lower end of the box A is a pipe, C, to lead down into the cistern. On the front side of the box is formed a spout, D, as shown. Above this spout the front of the box is made rounded, and provided with a horizontal slot, $b$, extending half around the box, with a short vertical slot, $d$, at each end of the slot $b$. Around the lower end of the inlet-pipe B is placed a short pipe, E, provided with an inclined partition, G, and the side of the pipe E is cut away opposite said partition, as shown in Fig. 2. The pipe E is further provided with a short stem, $f$, and handle H, the stem projecting through the slot $b$. By means of this handle the tube E may be turned so that the partition G will conduct the rain-water out through the spout D; or it may be turned so as to conduct water down through the outlet-pipe C into the cistern. In either case it is locked by pressing down the handle, so that the stem enters the vertical slot $d$ at one end of the slot $b$.

Having thus fully described my invention, what I claim as new, and desire to secure by Letters Patent, is—

1. The box A, provided with a horizontal slot, $b$, in combination with pipe E and partition G, all arranged to operate as and for the purpose set forth.

2. The stem $f$ and handle H on the pipe E, in combination with the horizontal slot $b$ and vertical end slots $d$ $d$ in the box A, substantially as and for the purposes herein set forth.

In testimony that I claim the foregoing as my own, I affix my signature in presence of two witnesses.

GEORGE STRASZER.

Witnesses:
W. F. SERJEANT,
ALEXANDER DRUESDAUS.